July 21, 1959  W. H. NEWELL  2,895,670
FLIGHT ANALYZER
Filed July 27, 1956  5 Sheets-Sheet 1

INVENTOR
WILLIAM H. NEWELL
BY
Victor D. Borst
ATTORNEY

United States Patent Office 2,895,670
Patented July 21, 1959

2,895,670

FLIGHT ANALYZER

William H. Newell, Mount Vernon, N.Y., assignor to Sperry Rand Corporation, Ford Instrument Company Division, Long Island City, N.Y., a corporation of Delaware Application July 27, 1956, Serial No. 600,575

6 Claims. (Cl. 235—61)

The present invention relates to the art of analyzing the flight of an aircraft while in motion, to determine continuously its orientation in relation to an earth oriented coordinate system moving with the aircraft. A system for this purpose may find utility, for example, in connection with the instrumentation of a gun fire control system on the aircraft.

One object of the present invention is to provide a new and improved system of continuously analyzing the flight of an aircraft, which avoids the use of such complicated gyroscopic devices as stable reference apparatus, gimbals, etc. and which can be made up of comparatively simple well known mechanical and/or electrical components, which is operable in response to measurements taken entirely within the aircraft, which because of its configuration, allows unlimited maneuverability to the plane, and which affords comparatively accurate flight analysis.

In accordance with certain features of the present invention the vector components representing the angular velocity of the aircraft coordinate system with respect to inertial space (i.e. the space with respect to which the laws of motion of Newton apply), are measured in the aircraft by means of an orthogonal triad of angular rate sensing gyroscopes, properly aligned with and affixed to the aircraft frame. Also, the vector components representing in combination the effects of linear acceleration of the aircraft with respect to inertial space and the acceleration due to the gravitational attraction of the earth are measured in the aircraft by means of an orthogonal triad of accelerometers, also properly aligned with and affixed to the aircraft frame. From these two sets of measured components and from the indicated components of the speed of the aircraft with respect to the air mass measured in the usual manner in the aircraft, the different components of the gravitational acceleration of the earth in the aircraft coordinate system and the true components of the velocity of the aircraft with respect of the air mass, are determined by the use of a gravity and velocity component computer. These gravitational component quantities are fed into a bank or roll and pitch resolver system to determine continuously the angles of roll and pitch of the aircraft, and the components of the true velocity of the aircraft's center of gravity with respect to the air mass are fed into an angle of attack solver to determine the angle of attack of the aircraft.

The roll, pitch and angle of attack, continuously obtained as described, determine the flight characteristics of the aircraft.

Various other objects, features and advantages of the invention are apparent from the following specification and from the accompanying drawings, in which.

Figure 1:
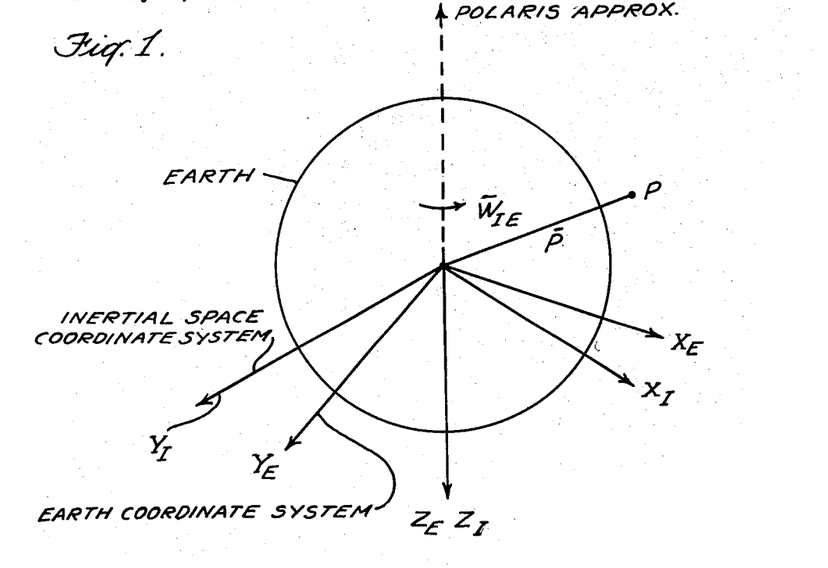
Fig. 1 is a diagram showing the inertial space coordinate system and the earth coordinate system with their origins at the center of the earth employed in connection with the solution of some of the problems involved.

Derivation of equations involved in the determination of the flight characteristics of the aircraft In solving the problems involved, we are concerned with four coordinate systems. One coordinate system referred to herein as the inertial space coordinate system, has its origin at the center of mass of the earth and has one axis, for example, directed from said origin to the first point of Aries or vernal equinox, and another axis directed approximately to the polaris. This inertial coordinate system is considered to be space fixed and is indicated in Fig. 1.

Another coordinate system involved in the solution of the problem, and herein referred to as the earth coordinate system, has its origin at the center of mass of the earth, with two axes in the equatorial plane and the third axis along the axis of rotation. This earth coordinate system is considered to rotate with the earth and is shown in Fig. 1.

Figure 2:
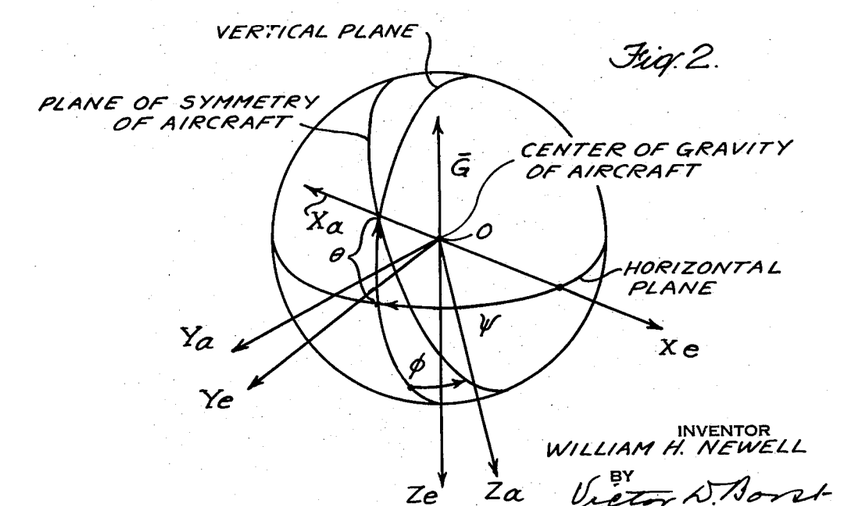
Fig. 2 is a diagram showing the aircraft coordinate system and the earth oriented coordinate system, with their origins at the center of gravity of the aircraft, employed in connection with the solution of some of the problems involved.
Figure 3:
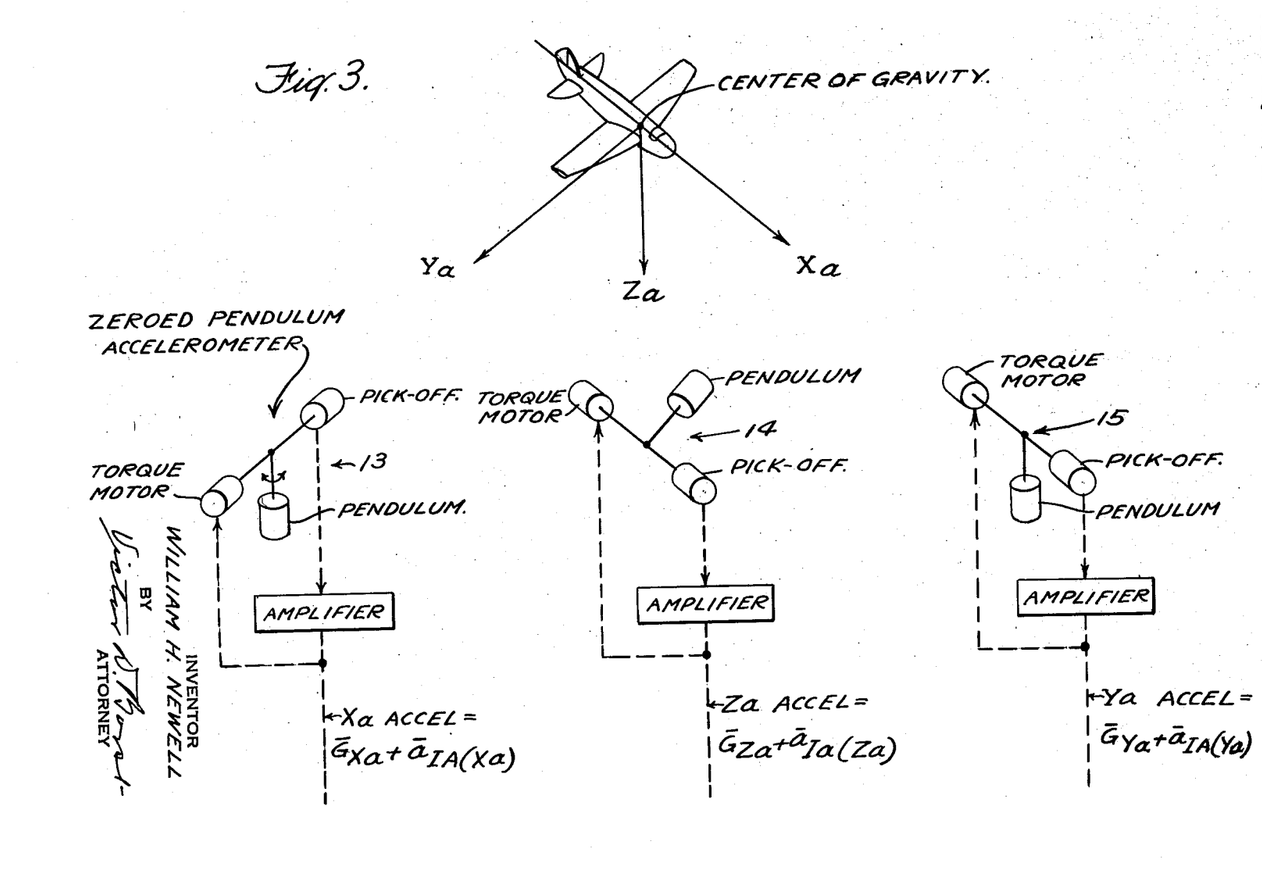
Figs. 3, 3A are a generalized diagram of the gravity and velocity component computer embodying the present invention and shown in connection with an aircraft to show the orientation of certain sensing devices of said system in the aircraft.

Another coordinate system involved in the solution of the problem and herein referred to as the aircraft coordinate system, has its origin at the center of gravity of the aircraft with two of its axes lying in the plane of symmetry of the aircraft, as shown in Figs. 2 and 3.

A fourth coordinate system, employed in determining the roll and pitch angles and angle of attack of the aircraft, and referred to herein as the earth oriented coordinate system, has its origin at the center of gravity of the aircraft and has its axes oriented north, east and vertically down. This earth oriented coordinate system is shown in Figs. 2 and 3.

In the following derivation, certain symbols are employed in accordance with common usage, to simplify mathematical representation. A line above a letter, thus $\bar{P}$, represents a vector quantity. A point over a letter $\dot{\bar{P}}$, represents the rate of change of the quantity indicated by the vector $\bar{P}$ with respect to time. Two points over a letter, thus $\ddot{\bar{P}}$, represents the rate of change of the quantity indicated by the quantity $\dot{\bar{P}}$ with respect to time.

It is assumed in the following derivation, that the center of gravity of the aircraft is located in space by a position vector $\bar{P}$, where the origin of the vector is the inertial reference point used for the origin of an inertial coordinate reference system $X_I$, $Y_I$, $Z_I$. This inertial reference point may be taken to be the center of mass of the earth with negligible error, as already described.

Then, applying the equation of Coriolis regarding the conversion of velocity vectors from one coordinate system to another, there is obtained $$\dot{\bar{P}}_I = \dot{\bar{P}}_E + \bar{W}_{IE} \times \bar{P} \qquad (1)$$

3 where $\dot{P}_I$=velocity of aircraft with respect to inertial space.
$\dot{P}_E$=velocity of aircraft with respect to the earth.
$\bar{W}_{IE}$=angular velocity of earth with respect to inertial space (see Fig. 1).
$\bar{P}$=position vector of aircraft with respect to the inertial reference point selected as the center of mass of the earth.
$\bar{W}_{IE} \times \bar{P}$=velocity of the aircraft due to rotation of the earth, with respect to inertial space.

$$\dot{P}_E = \bar{V}_{EW} + \bar{V}_{WA} \qquad (2)$$

where $\bar{V}_{EW}$=velocity vector of the air mass at the center of gravity of the aircraft with respect to the earth.
$\bar{V}_{WA}$=velocity vector of aircraft with respect to the air mass.

Substituting (2) into (1), we have $$\dot{P}_I = \bar{V}_{EW} + \bar{V}_{WA} + \bar{W}_{IE} \times \bar{P} \qquad (3)$$

Differentiating Equation 3, we obtain $\ddot{P}_I$=acceleration of the aircraft with respect to inertial space $$= (\dot{\bar{V}}_{EW})_I + (\dot{\bar{V}}_{WA})_I + (\dot{\bar{W}}_{IE})_I \times \bar{P} + \bar{W}_{IE} \times \dot{\bar{P}}_I \qquad (4)$$

where $(\dot{\bar{V}}_{EW})_I$=time rate of change with respect to inertial space of the air mass velocity with respect to the earth at the aircraft location.
$(\dot{\bar{V}}_{WA})_I$=time rate of change with respect to inertial space of the aircraft velocity with respect to the air mass at the aircraft location.
$(\dot{\bar{W}}_{IE})_I$=angular acceleration of the earth with respect to inertial space.

Applying the equation of Coriolis to the four terms on the right of Equation 4 after omitting the term $$(\dot{\bar{W}}_{IE})_I \times \bar{P}$$

which vanishes since $\bar{W}_{IE}$ is a constant, there is obtained $$\ddot{P}_I = (\dot{\bar{V}}_{EW})_E + \bar{W}_{IE} \times \bar{V}_{EW} + (\dot{\bar{V}}_{WA})_A + \bar{W}_{IA} \times \bar{V}_{WA} + 0 + \bar{W}_{IE} \times \bar{V}_{EW} + \bar{W}_{IE} \times \bar{V}_{WA} + \bar{W}_{IE} \times (\bar{W}_{IE} \times \bar{P}) \qquad (5)$$

where $(\dot{\bar{V}}_{EW})_E$=time rate of change with respect to the earth of the air mass velocity with respect to the earth.
$(\dot{\bar{V}}_{WA})_A$=time rate of change with respect to the aircraft of the aircraft velocity with respect to the air mass.
$\bar{W}_{IA}$=angular velocity of the aircraft coordinate system with respect to inertial space.

The term $\bar{W}_{IE} \times (\bar{W}_{IE} \times \bar{P})$ is negligible and may be omitted, while the term $(\dot{\bar{V}}_{EW})_E = 0$ if $\bar{V}_{EW}$ is assumed constant.

Substituting in Equation 5, $\bar{V}_{IA} = \bar{V}_{WA} + \bar{V}_{EW}$, where $\bar{V}_{IA}$=velocity of the aircraft with respect to inertial space, there is obtained the approximate equation $$\ddot{P}_I = (\dot{\bar{V}}_{WA})_A + \bar{W}_{IA} \times \bar{V}_{WA} + \bar{W}_{IE} \times \bar{V}_{EW} + \bar{W}_{IE} \times \bar{V}_{IA} \qquad (6)$$

In this Expression 6, $\bar{W}_{IE}$ is small so that the terms $\bar{W}_{IE} \times \bar{V}_{EW}$ and $\bar{W}_{IE} \times \bar{V}_{IA}$ may be neglected. With this further approximation, Equation 6 may be written $$\ddot{P}_I = (\dot{\bar{V}}_{WA})_A + \bar{W}_{IA} \times \bar{V}_{WA} \qquad (7)$$

The notation is simplified by substituting $\bar{V}_{WA} = \bar{V}$, so that the Expression 7 for the acceleration of the aircraft with respect to inertial space may be written $$\ddot{P}_I = (\dot{\bar{V}})_A + \bar{W}_{IA} \times \bar{V} \qquad (8)$$

The aircraft velocity vector with respect to the air mass referred to the air craft coordinate system is $$\bar{V} = \bar{1}_{Xa} V_{Xa} + \bar{1}_{Ya} V_{Ya} + \bar{1}_{Za} V_{Za} \qquad (9)$$

4 where $\bar{1}_{Xa}$, $\bar{1}_{Ya}$ and $\bar{1}_{Za}$ are unit vectors in the positive direction of the corresponding axes $Xa$, $Ya$ and $Za$ of the aircraft coordinate system, and $V_{Xa}$, $V_{Ya}$ and $V_{Za}$ are the velocity components in this system.

The time rate of change of the velocity vector $\bar{V}$ with respect to the aircraft coordinate system is accordingly $$(\dot{\bar{V}})_A = \bar{1}_{Xa} \dot{V}_{Xa} + \bar{1}_{Ya} \dot{V}_{Ya} + \bar{1}_{Za} \dot{V}_{Za} \qquad (10)$$

Similarly, the aircraft angular velocity vector with respect to inertial space, referred to the aircraft coordinate system, is $$\bar{W}_{IA} = \bar{1}_{Xa} W_{IA(Xa)} + \bar{1}_{Ya} W_{IA(Ya)} + \bar{1}_{Za} W_{IA(Za)} \qquad (11)$$

where $W_{IA(Xa)}$, $W_{IA(Ya)}$ and $W_{IA(Za)}$ are the scalar components of the angular velocity vector along the indicated axes.

Formation of the vector cross-product of the Expressions 11 and 9 gives $$\bar{W}_{IA} \times \bar{V} = \bar{1}_{Xa}[W_{IA(Ya)} V_{Za} - W_{IA(Za)} V_{Ya}] \qquad (12)$$
$$+ \bar{1}_{Ya}[W_{IA(Za)} V_{Xa} - W_{IA(Xa)} V_{Za}]$$
$$+ \bar{1}_{Za}[W_{IA(Xa)} V_{Ya} - W_{IA(Ya)} V_{Xa}]$$

Substitution of Expressions 10 and 12 in Equation 8 gives $$\ddot{P}_I = \bar{1}_{Xa}[\dot{V}_{Xa} + W_{IA(Ya)} V_{Za} - W_{IA(Za)} V_{Ya}] \qquad (13)$$
$$+ \bar{1}_{Ya}[\dot{V}_{Ya} + W_{IA(Za)} V_{Xa} - W_{IA(Xa)} V_{Za}]$$
$$+ \bar{1}_{Za}[\dot{V}_{Za} + W_{IA(Xa)} V_{Ya} - W_{IA(Ya)} V_{Xa}]$$

It is possible to measure the components of the vector $\bar{W}_{IA}$ in the aircraft system by means of an orthogonal triad of angular rate sensing gyroscopes 10, 11 and 12 (Figs. 3, 3A) properly aligned with and affixed to the aircraft frame. It is also possible to measure the components of the combined vector $\ddot{\bar{P}}_I + \bar{G}$ representing the effects of linear acceleration of the aircraft with respect to inertial space indicated by the symbol $\ddot{\bar{P}}_I$ and the acceleration due to the gravitational attraction of the earth indicated by the symbol $\bar{G}$. This measurement of acceleration is made by an orthogonal triad of accelerometers 13, 14 and 15 (Fig. 3) also properly aligned with and affixed to the aircraft. The center of mass of each accelerometer should be located at the center of gravity of the aircraft in order not to pick up linear accelerations due to the rotation of the aircraft. If this special location cannot be achieved, the analysis contained here must be modified and suitable corrections must be applied to the accelerometer outputs.

We can write the following vector expression for the combined accelerometer outputs $$\bar{G} + \ddot{\bar{P}}_I = \bar{1}_{Xa}[G_{Xa} + a_{IA(Xa)}] + \bar{1}_{Ya}[G_{Ya} + a_{IA(Ya)}] + \bar{1}_{Za}[G_{Za} + a_{IA(Za)}] \qquad (14)$$

where $G_{Xa}$, $G_{Ya}$ and $G_{Za}$ are the magnitudes of the components of the acceleration $\bar{G}$ along the aircraft coordinate axes $Xa$, $Ya$ and $Za$ respectively, due to the gravitational attraction of the earth and $a_{IA(Xa)}$, $a_{IA(Ya)}$ and $a_{IA(Za)}$ are the component magnitudes of the linear acceleration $\ddot{\bar{P}}_I$ of the aircraft with respect to inertial space measured along the aircraft coordinate axes $Xa$, $Ya$ and $Za$ respectively.

As the aircraft maneuvers in space, the components of $\bar{G}$ in the aircraft coordinate system will change in a manner dependent on the $\bar{W}_{IA}$ of the aircraft. However, $\bar{W}_{IA}$ is continuously measured by the rate gyros 13, 14 and 15 (Fig. 3) and the components of $\bar{G}$ must be such that $\bar{V} = \bar{V}'$, that is, the generated velocity $\bar{V}$ must agree with the measured or indicated velocity $\bar{V}'$. Applying the equation of Coriolis to the time rate of change of the vector $\bar{G}$, $$\dot{\bar{G}}_I = \dot{\bar{G}}_A + \bar{W}_{IA} \times \bar{G}$$

where $\dot{\bar{G}}_I$ is the time rate of change of the $\bar{G}$ vector with respect to inertial space, while $\dot{\bar{G}}_A$ is the time rate of change of $\bar{G}$ with respect to the aircraft coordinate system. But we also have $$\dot{\bar{G}}_I = \dot{\bar{G}}_E + \bar{W}_{IE} \times \bar{G}$$

which is negligible.

Therefore, neglecting errors due to gross changes of aircraft position, $$\dot{\bar{G}}_A = -\bar{W}_{IA} \times \bar{G} \quad (15)$$

We can write $$\bar{G}_{\text{control}} = K \dot{\bar{G}}_A \quad (16)$$

where K is a constant.

The components of $\bar{G}_{\text{control}}$ are obtained by comparing the components of the indicated aircraft velocity with the corresponding true velocity components of the center of gravity of the aircraft with respect to the air mass, obtained by processing the quantities derived from the aircraft component acceleration sensing devices 13, 14 and 15 (Fig. 3) and the quantities obtained from the aircraft component angular velocity sensing devices 10, 11 and 12 (Fig. 3A) in a velocity and gravity component computer (Figs. 3, 3A and 4), to eliminate the effect of gravity in the quantities obtained from the acceleration sensing devices 13, 14 and 15. The components of the $\bar{G}$ control fed into integrators in conjunction with the components of the quantity $\dot{\bar{G}}_A$ obtained in accordance with Equation 15 are employed to derive the components of the $\bar{G}$ quantity. These $\bar{G}$ components are then employed in a bank or roll and pitch angle solver shown in Fig. 5, to obtain the angle of roll $\phi$ and the angle of pitch $\theta$.

The resolver system for the aspect or orientation angles $\theta$ and $\phi$ of the aircraft depends upon the resolution of the vector $\bar{G}$ in the aircraft system. From the diagram of Fig. 2, showing the earth oriented coordinate system and the aircraft coordinate system at the center of gravity of the aircraft, it is seen by spherical trigonometry that $$G_{Xa} = G \cos Z_e O X_a$$
$$= G \sin \theta$$

$$G_{Ya} = G \cos Z_e O Y_a$$
$$= G \left[ \cos \frac{\pi}{2} \cos \left( \frac{\pi}{2} - \theta \right) + \sin \frac{\pi}{2} \sin \left( \frac{\pi}{2} - \theta \right) \cos \left( \frac{\pi}{2} + \phi \right) \right]$$
$$= -G \cos \theta \sin \phi$$

$$G_{Za} = G \cos Z_e O Z_a$$
$$= -G \cos \theta \cos \phi$$

Therefore, $$\bar{G} = G \sin \theta \cdot \bar{1}_{Xa} - G \cos \theta \sin \phi \cdot \bar{1}_{Ya} - G \cos \theta \cos \phi \cdot \bar{1}_{Za}$$

$$G = G_{Xa} \sin \theta - G_{Ya} \cos \theta \sin \phi - G_{Za} \cos \theta \cos \phi$$

We therefore, can write as the pitch control equation $$G_{Xa} \cos \theta + G_{Ya} \sin \theta \sin \phi + G_{Za} \sin \theta \cos \phi = 0 \quad (17)$$

We can write the roll control equation as follows:

$$G_{Ya} \cos \phi - G_{Za} \sin \phi = 0 \quad (18)$$

Figure 5:
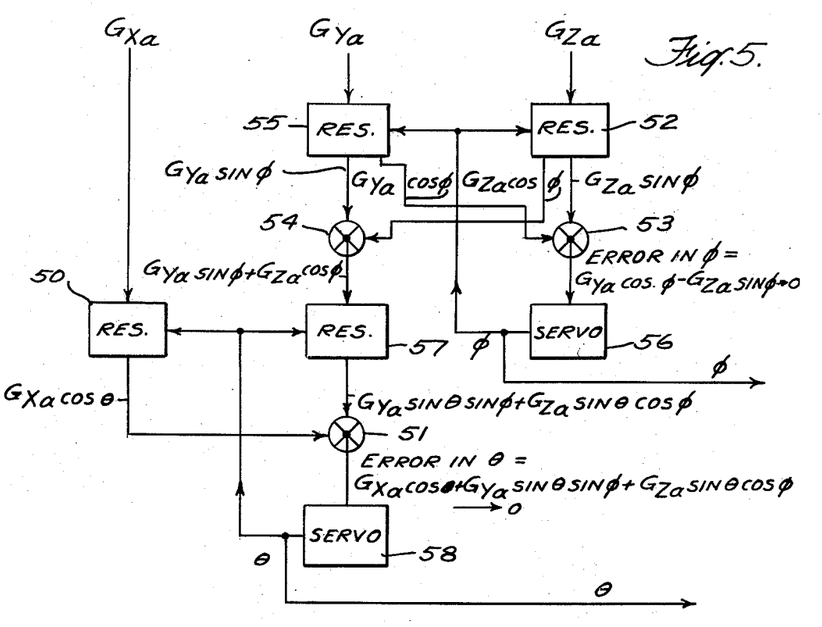
Fig. 5 is a diagram of the roll and pitch angle solver embodying the present invention.

The two Equations 17 and 18 can be mechanized in a roll and pitch angle solver shown in Fig. 5 for the pitch angle $\theta$ and the roll angle $\phi$.

Considering the vector V and its component $V_{Xa}$ making angle $\alpha$ with said vector and the component $V_{Za}$ at right angles to the component $V_{Xa}$, we have $$V_{Xa} \cos \alpha + V_{Za} \sin \alpha = V \text{ or } V_{Xa} \sin \alpha - V_{Za} \cos \alpha = 0 \quad (19)$$

where $\alpha$ is the angle of attack or the course or heading of the longitudinal axis of the aircraft. This orientation angle $\alpha$ can be obtained by mechanizing Equation 19 in an attack angle solver shown in Fig. 6.

In the mechanization of the different equations described, $V_{Xa}$, $V_{Ya}$, $V_{Za}$ are assumed to be measured by self-sufficient equipment within the aircraft. Thus, we may take $V_{Xa}'$ = smoothed value of indicated airspeed (speed of the aircraft in relation to the air mass), the smoothing of this quantity being inherent in the instrumentation employed for measuring this airspeed.

$V_{Ya}' = 0$ or the average value of side slip velocity assumed to be zero.

$V_{Za}'$ = smoothed value of normal velocity of the aircraft in relation to the air mass obtained as an approximate computable function of Indicated airspeed ______________________________ V
Angle of attack ________________________________ $\alpha$
Altitude ______________________________________ H
Mach number __________________________________ M
Temperature __________________________________ T aircraft center of gravity location with respect to aircraft coordinate system (this center of gravity varies as the fuel is used up but the fuel reservoir may be arranged, so that the center of gravity does not vary materially with consumption of fuel).

Thus, the indicated or measured velocity vector V' is determined in magnitude by the components $V'_{Xa}$, $V'_{Ya}$, $V'_{Za}$ measured in the aircraft. The problem under consideration is the determination of the orientation of the vector V with respect to the air mass.

*Mechanization of the system in general*

In the different mechanizing systems described herein, the different elements thereof, such as differentials, multipliers, resolvers, servos, angular rate sensing gyroscopes and accelerometers are per se, well-known devices and for the sake of simplicity, these elements are illustrated diagrammatically.

Figure 3A:
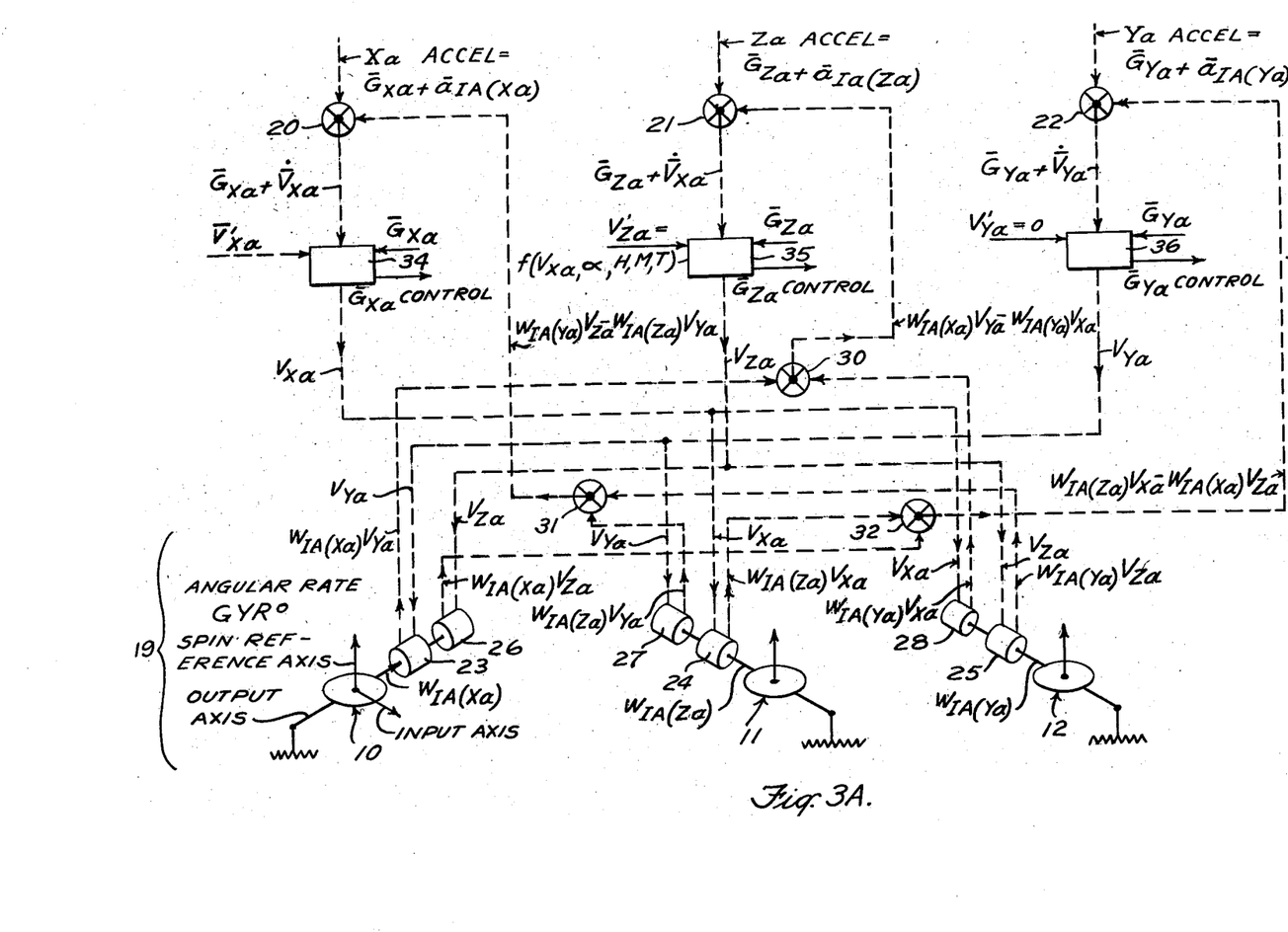

Figs. 3, 3A show part of the general mechanizing system of the present invention and more specifically the velocity computing part in relation to an aircraft A on which the system is mounted. The aircraft A is shown in connection with its coordinate system $Xa$, $Ya$ and $Za$ at its center of gravity. At the center of gravity of the aircraft are the angular rate sensing gyroscopes 10, 11 and 12 properly oriented and aligned with and affixed to the aircraft frame, as shown. The sensing gyroscope 10 measures $\bar{W}_{IA(Xa)}$ which is the $Xa$ component of the vector $\bar{W}_{IA}$, i.e. the angular velocity of the aircraft system with respect to inertial space, the sensing gyroscope 11 measures $\bar{W}_{IA(Za)}$ which is the $Za$ component of the vector $\bar{W}_{IA}$ and the sensing gyroscope 12 measures. $\bar{W}_{IA(Ya)}$, which is the $Ya$ component of the vector $\bar{W}_{IA}$.

The components of the combined vector $\bar{P} + \bar{G}$ representing the combined effects of linear acceleration of the aircraft with respect to inertial space and the acceleration $\bar{G}$ due to the gravitational attraction of the earth are measured by the accelerometers 13, 14 and 15. The accelerometer 13 measures the component $$\bar{G}_{Xa} + \bar{a}_{IA(Xa)}$$

the accelerometer 14 measures the component $$\bar{G}_{Za} + \bar{a}_{IA(Za)}$$

and the accelerometer 15 measures the component $$\bar{G}_{Ya} + \bar{a}_{IA(Ya)}$$

Figure 4:
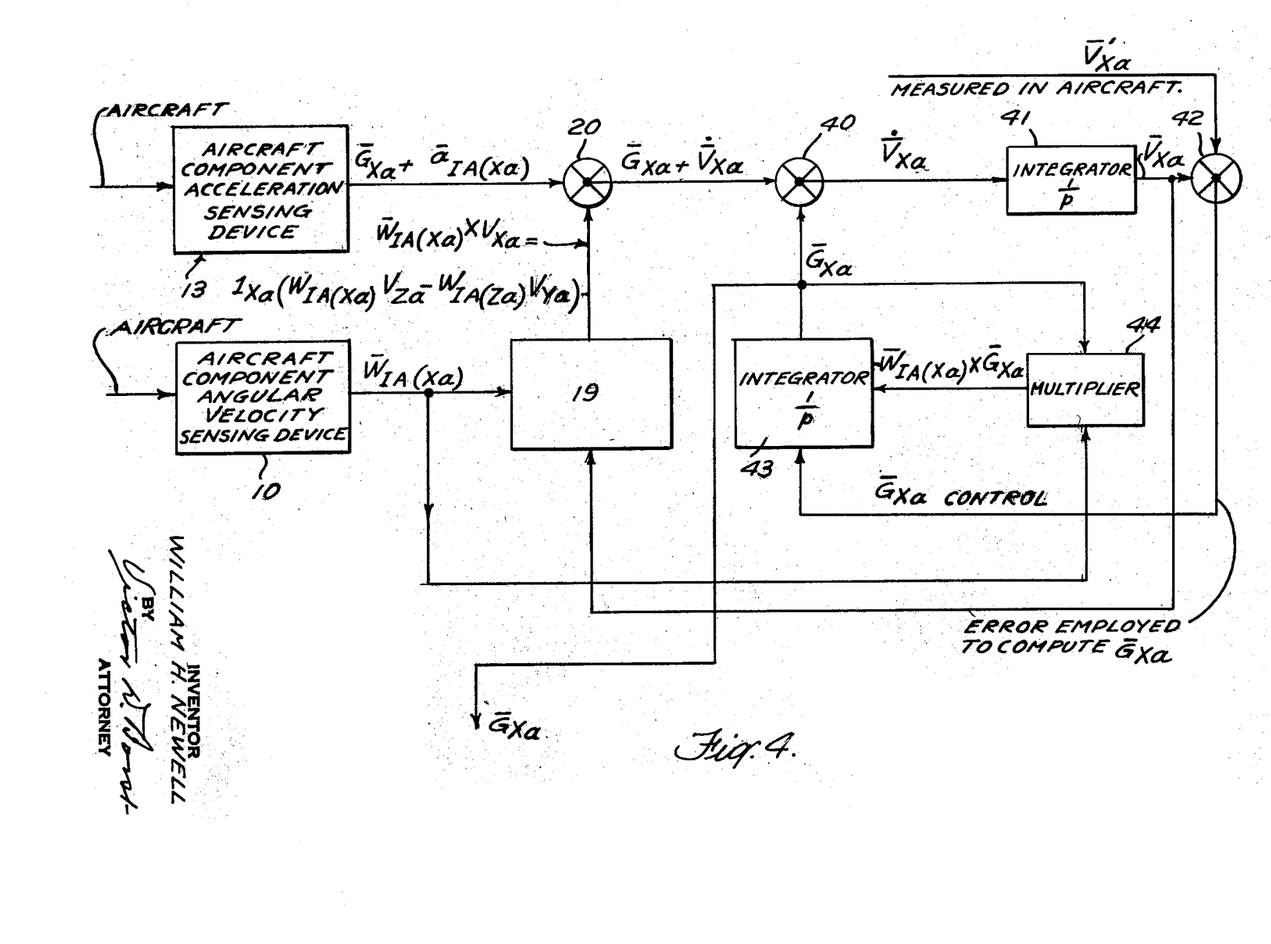
Fig. 4 is a diagram of the gravity and velocity component computer of Figs. 3, 3A but shown with some of the parts in greater detail.

The quantities representing these acceleration components, after being amplified in amplifiers 16, 17 and 18 respectively are fed into differentials 20, 21 and 22 respectively. Also fed into these differentials 20, 21 and 22 are the quantities $$(W_{IA(Ya)} V_{Za} - W_{IA(Za)} V_{Ya})$$
$$(W_{IA(Za)} V_{Xa} - W_{IA(Xa)} V_{Za})$$
$$(W_{IA(Xa)} V_{Ya} - W_{IA(Ya)} V_{Xa})$$

representing terms employed in accordance with Equations 12 and 13. These quantities are obtained from a computing system 19 (Figs. 3, 3A and 4) as follows:

On the output sides of the sensing gyroscopes 10, 11 and 12 are the multipliers 23, 24 and 25 respectively, and multipliers 26, 27 and 28 respectively, these multipliers being arranged in pairs with the multipliers 23 and 26 connected to the output axis of the sensing gyroscope 10, the multipliers 24 and 27 connected to the output axis of the sensing gyroscope 11 and the multipliers 25 and 28 connected to the output axis of the sensing gyroscope 12. Three differentials 30, 31 and 32 receive the outputs of the multipliers 23, 24, 25, 26, 27 and 28 and compare these outputs in the manner to be described, to obtain the correction terms employed in accordance with Equations 12 and 13.

To obtain the correction quantity $$W_{IA(Ya)}V_{Za} - W_{IA(Za)}V_{Ya}$$

in Equation 12, $W_{IA(Ya)}$ from the output axis of the sensing gyroscope 12 goes into the multiplier 25 in connection with $V_{Za}$ obtained from an integrator system 35, in a manner to be more fully described, to obtain the product $W_{IA(Ya)}V_{Za}$. The quantity $W_{IA(Za)}$ from the output axis of the sensing gyroscope 11 goes into the multiplier 27 in connection with $V_{Ya}$ obtained from an integrator system 36 to obtain the product $W_{IA(Za)}V_{Ya}$. The two products $W_{IA(Ya)}V_{Za}$ and $W_{IA(Za)}V_{Ya}$ compared in the differential 31 result in the correction term $W_{IA(Ya)}V_{Za} - W_{IA(Za)}V_{Ya}$.

To obtain the correction quantity $$W_{IA(Xa)}V_{Ya} - W_{IA(Ya)}V_{Xa}$$

in Equations 12 and 13, $W_{IA(Xa)}$ from the output axis of the sensing gyroscope 10 goes into the multiplier 23 in connection with $V_{Ya}$ obtained from the integrator system 36 in the manner to be more fully described, to obtain the product $W_{IA(Xa)}V_{Ya}$. The quantity $W_{IA(Ya)}$ from the output axis of the sensing gyroscope 12 goes into the multiplier 28 in connection with the quantity $V_{Xa}$ obtained from the integrator system 34 to obtain the product $W_{IA(Ya)}V_{Xa}$. The two products $W_{IA(Xa)}V_{Ya}$ and $W_{IA(Ya)}V_{Xa}$ compared in the differential 30 result in the correction term $W_{IA(Xa)}V_{Ya} - W_{IA(Ya)}V_{Xa}$.

To obtain the correction quantity $$W_{IA(Za)}V_{Xa} - W_{IA(Xa)}V_{Za}$$

the quantity $W_{IA(Za)}$ from the output of the sensing gyroscope 11 goes into the multiplier 24 in connection with $V_{Xa}$ obtained from the integrator system 34, in a manner to be more fully described, to obtain the product $W_{IA(Za)}V_{Xa}$. The quantity $W_{IA(Xa)}$ from the output axis of the sensing gyroscope 10 goes into the multiplier 26 in conjunction with $V_{Za}$ obtained from the integrator system 35 to obtain the product $W_{IA(Xa)}V_{Za}$. The two products $W_{IA(Za)}V_{Xa}$ and $W_{IA(Xa)}V_{Xa}$ and $W_{IA(Xa)Za}$ compared in the differential 32 result in the correction term $W_{IA(Za)}V_{Xa} - W_{IA(Xa)}V_{Za}$.

The three correction quantities $$W_{IA(Ya)}V_{Za} - W_{IA(Za)}V_{Ya},\ W_{IA(Xa)}V_{Ya} - W_{IA(Ya)}V_{Xa}$$

and $$W_{IA(Za)}V_{Xa} - W_{IA(Xa)}V_{Za}$$

are fed into differentials 20, 21 and 22 in conjunction with the acceleration components $$\bar{G}_{Xa} + \bar{a}_{IA(Xa)},\ \bar{G}_{Za} + \bar{a}_{IA(Za)}\ \text{and}\ \bar{G}_{Ya} + \bar{a}_{IA(Ya)}$$

derived from the accelerometers 13, 14 and 15, to obtain the outputs $$\bar{G}_{Xa} + \dot{V}_{Xa},\ \bar{G}_{Za} + \dot{V}_{Za}\ \text{and}\ \bar{G}_{Ya} + \dot{V}_{Ya}$$

following Equation 8.

Fig. 4 shows one of the velocity and gravity component computers for obtaining the quantity $\bar{G}_{Xa}$. This computer includes part of the system shown in Figs. 3, 3A. In this computer, the output $\bar{W}_{IA(Xa)}$ from the aircraft component angular velocity sensing device 10 is processed in the system 19 in conjunction with $\bar{V}_{Xa}$ obtained in a manner to be described, to obtain $$\bar{W}_{IA(Xa)} \times \bar{V}_{Xa}$$

equal to $$\bar{I}_{Xa}[W_{IA(Xa)}V_{Za} - W_{IA(Za)}V_{Ya}]$$

Since $\bar{I}_{Xa}$ is constant, $W_{IA(Xa)}V_{Za} - W_{IA(Za)}V_{Ya}$ obtained in a manner described, is multiplied by instrumentation by a factor corresponding to $\bar{I}_{Xa}$ to obtain $\bar{V}_{Xa}$.

The quantity $\bar{W}_{IA(Xa)} \times \bar{V}_{Xa}$ and the acceleration component $\bar{G}_{Xa} \times \bar{a}_{IA(Xa)}$ derived from the aircraft component acceleration sensing device 13 are added in the differential 20 to obtain $\bar{G}_{Xa} + \bar{V}_{Xa}$. This quantity $\bar{G}_{Xa} + \bar{V}_{Xa}$ and the quantity $V'_{Xa}$ are processed through the integrating system 34 of Fig. 3A to obtain the quantities $\bar{V}_{Xa}$ and $\bar{G}_{Xa\ control}$. In Fig. 4 the components 40, 41 and 42 of this integrator system 34 are shown.

Referring to Fig. 4, $\bar{G}_{Xa} + \dot{V}_{Xa}$ is compared with $\bar{G}_{Xa}$ obtained in a manner to be described, to obtain the output $\dot{V}_{Xa}$. This quantity $\dot{V}_{Xa}$ processed in the integrator 41, results in $\bar{V}_{Xa}$ which is fed into the differential 42 and also into the system 19. Also fed into the differential 42 is $\bar{V}'_{Xa}$ which is the smoothed value of the indicated speed of the aircraft in relation to the air mass. The output of this differential 42 is the $\bar{G}_{Xa}$ control quantity, which is fed into an integrator 43 in conjunction with $-\bar{W}_{IA(Xa)} \times \bar{G}_{Xa}$ derived from a multiplier 44 to obtain $\bar{G}_{Xa}$, in accordance with Equations 15 and 16. This quantity $\bar{G}_{Xa}$ is fed into the differential 40 for the purpose already described, and is also one of the gravity component quantities to be fed into the roll and pitch angle solver shown in Fig. 5.

The gravity component $\bar{G}_{Za}$ is similarly obtained in a velocity and gravity component solver similar to that shown in Fig. 4. In this solver, the input $V'_{za}$ into a differential corresponding to differential 42 of Fig. 4, is the smoothed value of normal velocity obtained by well-known mechanical or electrical means as a function of the indicated airspeed V, the angle of attack α, the altitude H, the Mach number and the temperature, as already indicated. In this gravity component computer, the system 19 of Fig. 3 is employed, but the output utilized is $W_{IA(Xa)}V_{Ya} - W_{IA(Ya)}V_{Xa}$.

The gravity component $\bar{G}_{Ya}$ is similarly obtained in a velocity and gravity component solver similar to that shown in Fig. 4, except that a differential corresponding to differential 42 is eliminated, since $V'_{Ya}$, the average value of side-slip velocity is assumed to be zero. The system 19 is employed as in Fig. 4, except that the output utilized would be $W_{IA(Za)}V_{Xa} - W_{IA(Xa)}V_{Za}$.

The three gravity vector component quantities $\bar{G}_{Xa}$, $\bar{G}_{Za}$ and $\bar{G}_{Ya}$ obtained as described, and translated into the corresponding magnitude quantities $G_{Xa}$, $G_{Za}$ and $G_{Ya}$, are fed into the bank and pitch solver shown in Fig. 5, to obtain the pitch angle θ and the roll angle φ, in accordance with Equations 17 and 18. For that purpose, the gravity component $G_{Xa}$ is fed into a resolver 50 in conjunction with the quantity θ derived in a manner to be described, to obtain the output $G_{Xa} \cos θ$. This output quantity $G_{Xa} \cos θ$ is delivered to a differential 51.

The gravity component $G_{Za}$ is fed into a resolver 52 in conjunction with the quantity φ, derived in a manner to be described, to obtain the output quantities $G_{Za} \cos φ$ and $G_{Za} \sin φ$. The quantity $G_{Za} \sin φ$ is fed to a differential 53 and the quantity $G_{Za} \cos φ$ is fed to a differential 54.

The gravity component $G_{Ya}$ is fed to a resolver 55 in conjunction with the quantity φ to obtain the output quantities $G_{Ya} \sin φ$ and $G_{Ya} \cos φ$. The quantity $G_{Ya} \sin φ$ goes into the differential 54 and the quantity $G_{Ya} \cos φ$ goes into the differential 53. The output of the differential 53 is $G_{Ya} \cos \phi - G_{Za} \sin \phi$ which should be zero in accordance with the roll control Equation 18 but which may deviate therefrom by an error quantity which is processed through a servo mechanism 56 to obtain the roll angle $\phi$. This angle quantity $\phi$ is delivered to the two resolvers 52 and 55, as described and is one of the aspect angles sought.

The output of the differential 54 is $G_{Ya} \sin \phi + G_{Za} \cos \phi$ which is fed into a resolver 57 in conjunction with the pitch angle $\theta$. The output of this resolver 57 is $G_{Ya} \sin \theta \sin \phi + G_{Za} \sin \theta \cos \phi$ which is fed into the differential 51. The output of this differential 51 is $G_{Xa} \cos \theta + G_{Ya} \sin \theta \sin \phi + G_{Za} \sin \theta \cos \phi$, which should be zero in accordance with the pitch control Equation 17, but which may deviate therefrom by an error quantity, which is processed through a servo mechanism 58 to obtain the pitch angle $\theta$. This angle quantity $\theta$ is delivered to the two resolvers 50 and 57 for the purpose described, and is another of the aspect angles sought.

Figure 6:
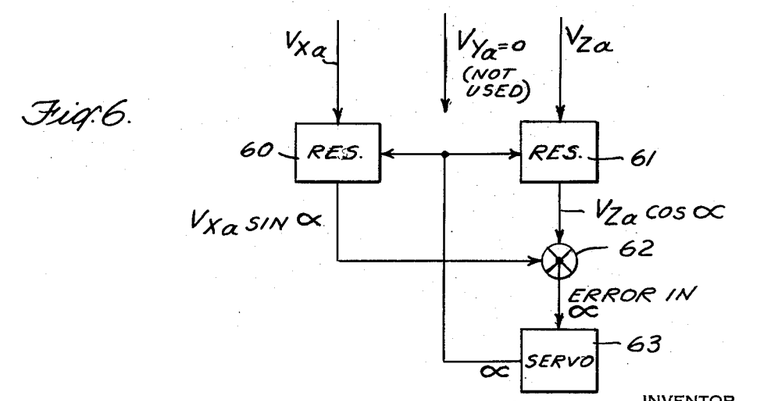
Fig. 6 is a diagram of the angle of attack solver embodying the present invention.

To obtain the angle of attack $\alpha$ in accordance with Equation 19, the velocity quantities $V_{Xa}$ and $V_{Za}$ obtained from the velocity and gravity computer of Fig. 4, are employed in the attack angle solver shown in Fig. 6, while the side-slip quantity $V_{Ya}$ assumed to be zero is not used. The quantity $V_{Xa}$ is fed into a resolver 60 in conjunction with the angle quantity $\alpha$ obtained in a manner to be described, to derive $V_{Xa} \sin \alpha$. The quantity $V_{Za}$ is fed into a resolver 61 in conjunction with the angle quantity $\alpha$ to obtain $V_{Za} \cos \alpha$. The two quantities $V_{Za} \sin \alpha$ and $V_{Za} \cos \alpha$ are compared in a differential 62 to obtain $V_{Xa} \sin \alpha - V_{Za} \cos \alpha$ which should be zero in accordance with the attack angle control Equation 19, but which may deviate therefrom by an error quantity, which is processed through a servo mechanism 63 to obtain the angle quantity $\alpha$. This angle quantity $\alpha$ is fed to the two resolvers 60 and 61 for the purpose indicated.

It is seen that by means of the system of the present invention, the angles $\theta$, $\phi$ and $\alpha$ are continuously obtained as the aircraft maneuvers in the air by measurements taken within the aircraft without the use of stable reference apparatus, gimbals etc.

What is claimed is:

1. A system of determining the flight characteristics of an aircraft in motion, comprising means for measuring the three components $W_{IA(Xa)}$, $W_{IA(Ya)}$ and $W_{IA(Zn)}$ of the angular velocity of the aircraft coordinate system in relation to inertial space along the three axes $Xa$, $Ya$ and $Za$ of the coordinate system respectively to obtain three corresponding quantities in physical form, $Xa$ representing the axis along the aircraft, $Ya$ representing the axis cross-wise of the aircraft and $Za$ representing the normal axis, means for measuring the three components $$\overline{G}_{Xa} + \overline{a}_{IA(Xa)},\ \overline{G}_{Ya} + \overline{a}_{IA(Ya)}$$

and $$\overline{G}_{Za} + \overline{a}_{IA(Za)}$$

along the three axes $Xa$, $Ya$ and $Za$ of said system respectively of the vector representing the combined effects of the acceleration $\overline{G}$ due to the gravitational attraction of the earth and of the linear acceleration $\overline{a}$ of the aircraft with respect to inertial space, to obtain the three corresponding quantities in physical form, means for feeding in physical form as inputs into the system the quantities $\overline{V}'_{Xa}$ and $\overline{V}'_{Za}$ corresponding to the values of the indicated airspeed of the aircraft and the value of the normal velocity of the aircraft in relation to the air mass respectively, means for mechanizing said quantities in accordance with the following relations $$\dot{\overline{G}}_{Xa} = -\overline{W}_{IA(Xa)} \times \overline{G}_{Xa}$$

$$\dot{\overline{G}}_{Ya} = -\overline{W}_{IA(Ya)} \times \overline{G}_{Ya}$$

$$\dot{\overline{G}}_{Za} = -\overline{W}_{IA(Za)} \times \overline{G}_{Za}$$

$$\overline{G}_{Xa\ \text{control}} = K' \dot{\overline{G}}_{Xa}$$

$$\overline{G}_{Ya\ \text{control}} = K'' \dot{\overline{G}}_{Ya}$$

$$\overline{G}_{Za\ \text{control}} = K''' \dot{\overline{G}}_{Za}$$

$$\dot{\overline{V}}_{Xa} = \overline{a}_{IA(Xa)} + \overline{W}_{IA(Xa)} \times \overline{V}_{Xa}$$

$$\dot{\overline{V}}_{Ya} = \overline{a}_{IA(Ya)} + \overline{W}_{IA(Ya)} \times \overline{V}_{Ya}$$

$$\dot{\overline{W}}_{Za} = \overline{a}_{IA(Za)} + \overline{W}_{IA(Za)} \times \overline{V}_{Za}$$

wherein $\dot{\overline{V}}_{Xa}$, $\dot{\overline{V}}_{Ya}$ and $\dot{\overline{V}}_{Za}$ are the components of the vector representing the acceleration of the aircraft in relation to the air mass along the three axes $Xa$, $Ya$ and $Za$ respectively, $\overline{V}_{Xa}$, $\overline{V}_{Ya}$ and $\overline{V}_{Za}$ are the corresponding velocities, $K'$, $K''$ and $K'''$ represent constants and $\overline{G}_{Xa\ \text{control}}$, $\overline{G}_{Ya\ \text{control}}$ and $\overline{G}_{Za\ \text{control}}$ represent the difference between $\overline{V}'_{Xa}$ and $\overline{V}_{Xa}$, $\overline{V}_{Ya}$ and the difference between $\overline{V}'_{Za}$ and $\overline{V}_{Za}$ respectively, to obtain the quantities $\overline{G}_{Xa}$, $\overline{G}_{Ya}$ and $\overline{G}_{Za}$ respectively in physical form, and equation mechanizing means responsive to the quantities $\overline{G}_{Xa}$, $\overline{G}_{Ya}$ and $\overline{G}_{Za}$ as inputs for producing a quantity in physical form representing the pitch angle of the aircraft.

2. A system of determining the flight characteristics of an aircraft in motion, comprising means for measuring the two components $W_{IA(Ya)}$ and $W_{IA(Za)}$ of the angular velocity of the aircraft coordinate system in relation to inertial space along the axes $Ya$ and $Za$ of the coordinate respectively to obtain two corresponding quantities in physical form, $Ya$ representing the axis cross-wise of the aircraft and $Za$ representing the normal axis, means for measuring the components $$\overline{G}_{Ya} + \overline{a}_{IA(Ya)}$$

and $$\overline{G}_{Za} + \overline{a}_{IA(Za)}$$

along the axes $Ya$ and $Za$ of said system respectively of the vector representing the combined effects of the acceleration $\overline{G}$ due to the gravitational attraction of the earth and of the linear acceleration $\overline{a}$ of the aircraft with respect to inertial space, to obtain the corresponding quantities in physical form, means for feeding in physical form as inputs into the system the quantity $\overline{V}'_{Za}$ corresponding to the value of the normal velocity of the aircraft in relation to the air mass respectively, means for mechanizing said quantities in accordance with the following relations $$\dot{\overline{G}}_{Ya} = -\overline{W}_{IA(Ya)} \times \overline{G}_{Ya}$$

$$\dot{\overline{G}}_{Za} = -\overline{W}_{IA(Za)} \times \overline{G}_{Za}$$

$$\overline{G}_{Ya\ \text{control}} = K'' \dot{\overline{G}}_{Ya}$$

$$G_{Za\ \text{control}} = K''' \dot{\overline{G}}_{Za}$$

$$\dot{\overline{V}}_{Ya} = \overline{a}_{IA(Ya)} + \overline{W}_{IA(Ya)} \times \overline{V}_{Ya}$$

$$\dot{\overline{V}}_{Za} = \overline{a}_{IA(Za)} + \overline{W}_{IA(Za)} \times \overline{V}_{Za}$$

wherein $\dot{\overline{V}}_{Ya}$ and $\dot{\overline{V}}_{Za}$ are the components of the vector representing the acceleration of the aircraft in relation to the air mass along the axes $Ya$ and $Za$ respectively, $\overline{V}_{Ya}$ and $\overline{V}_{Za}$ are the corresponding velocities, $K''$ and $K'''$ represents constants and $\overline{G}_{Ya\ \text{control}}$ and $\overline{G}_{Za\ \text{control}}$ represent $\overline{V}_{Ya}$ and the difference between $\overline{V}'_{Za}$ and $\overline{V}_{Za}$ respectively, to obtain the quantities $\overline{G}_{Ya}$ and $\overline{G}_{Za}$ respectively in physical form, and equation mechanizing means responsive to the quantities $\overline{G}_{Ya}$ and $\overline{G}_{Za}$ as inputs for producing a quantity in physical form representing the roll angle of the aircraft.

3. A system of determining the flight characteristics of an aircraft in motion, comprising means for measuring the two components $W_{IA(Xa)}$ and $W_{IA(Za)}$ of the angular velocity of the aircraft coordinate system in relation to inertial space along the axes $Xa$ and $Za$ of the coordinate system respectively to obtain two corresponding quantities in physical form, $Xa$ representing the axis along the aircraft and $Za$ representing the normal axis, means for measuring the components $$\bar{G}_{Xa} + \bar{a}_{IA(Xa)}$$

and $$\bar{G}_{Za} + \bar{a}_{IA(Za)}$$

along the axes, $Xa$ and $Za$ of said coordinate system respectively of the vector representing the combined effects of the acceleration $\bar{G}$ due to the gravitational attraction of the earth and of the linear acceleration $\bar{a}$ of the aircraft with respect to inertial space, to obtain the corresponding qualities in physical form, means for feeding in physical form as inputs into the system the quantity $\bar{V}'_{Za}$ corresponding to the value of the normal velocity of the aircraft in relation to the air mass respectively, means for mechanizing said quantities in accordance with the following relations $$\dot{\bar{G}}_{Xa} = -\bar{W}_{IA(Xa)} \times \bar{G}_{Xa}$$

$$\dot{\bar{G}}_{Za} = -\bar{W}_{IA(Za)} \times \bar{G}_{Za}$$

$$G_{Xa\ \text{control}} = K' \dot{\bar{G}}_{Xa}$$

$$G_{Za\ \text{control}} = K''' \dot{\bar{G}}_{Za}$$

$$\dot{\bar{V}}_{Xa} = \bar{a}_{IA(Xa)} + \bar{W}_{IA(Xa)} \times \bar{V}_{Xa}$$

$$\dot{\bar{V}}_{Za} = \bar{a}_{IA(Za)} + \bar{W}_{IA(Za)} \times \bar{V}_{Za}$$

wherein $\dot{\bar{V}}_{Ya}$ and $\dot{\bar{V}}_{Za}$ are components of the vector representing the acceleration of the aircraft in relation to the air mass along the axes $Xa$ and $Za$ respectively, $\bar{V}_{Xa}$ and $\bar{V}_{Za}$ are the corresponding velocities, $\bar{G}_{Xa\ \text{control}}$ and $\bar{G}_{Za\ \text{control}}$ represent the difference between $\bar{V}'_{Xa}$ and $\bar{V}_{Xa}$ and the difference between $\bar{V}'_{Za}$ and $\bar{V}_{Za}$ respectively, and $K'$ and $K'''$ represent constants, to obtain the quantities $V_{Xa}$ and $V_{Za}$ respectively in physical form and means responsive to the quantities $V_{Xa}$ and $V_{Za}$ as inputs for producing a quantity in physical form representing the angle of attack of the aircraft.

4. A system of determining the flight characteristics of an aircraft in motion as described in claim 1, wherein said equation mechanizing means solves the equation $$G_{Xa} \cos\theta + G_{Ya} \sin\theta \sin\phi + G_{Za} \sin\theta \cos\phi = 0$$

for the pitch angle $\theta$ of the aircraft.

5. A system of determining the flight characteristics of an aircraft in motion as described in claim 2, wherein said equation mehanizing means solves the equation $$G_{Ya} \cos\phi - G_{Za} \sin\phi = 0$$

for the roll angle $\phi$ of the aircraft.

6. A system of determining the flight characteristics of an aircraft in motion as described in claim 3, wherein said equation mechanizing means solves the equation $$V_{Xa} \sin\alpha - V_Z \cos\alpha = 0$$

for the angle of attack.

References Cited in the file of this patent

UNITED STATES PATENTS

| | | |
|---|---|---|
| 2,600,159 | Ergen | June 10, 1952 |
| 2,613,071 | Hansel | Oct. 7, 1952 |
| 2,805,022 | Shelley | Sept. 3, 1957 |

OTHER REFERENCES

"Servomechanism Practice" (Ahrendt), published by McGraw-Hill (New York) 1954 (pages 47 and 48 relied on).

"The Role of the Stable Platform," Inter-Avia, volume XI, No. 6, 1956.